US012744413B2

(12) United States Patent
Tanaka et al.

(10) Patent No.: US 12,744,413 B2
(45) Date of Patent: Sep. 22, 2026

(54) ELECTRONIC DEVICE, WIRELESS POWER TRANSMISSION SYSTEM, CONTROL METHOD, AND CONTROL PROGRAM

(71) Applicant: KYOCERA Corporation, Kyoto (JP)

(72) Inventors: Yuuya Tanaka, Yokohama (JP); Katsutoshi Kawai, Ichinomiya (JP); Tomoyuki Nakasha, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 311 days.

(21) Appl. No.: 18/573,288

(22) PCT Filed: Jun. 3, 2022

(86) PCT No.: PCT/JP2022/022663
§ 371 (c)(1),
(2) Date: Dec. 21, 2023

(87) PCT Pub. No.: WO2023/276556
PCT Pub. Date: Jan. 5, 2023

(65) Prior Publication Data

US 2024/0291323 A1 Aug. 29, 2024

(30) Foreign Application Priority Data

Jun. 29, 2021 (JP) ................................ 2021-108080

(51) Int. Cl.
*H02J 50/20* (2016.01)
*H02J 50/80* (2016.01)
*H04W 64/00* (2009.01)

(52) U.S. Cl.
CPC .............. *H02J 50/20* (2016.02); *H02J 50/80* (2016.02); *H04W 64/006* (2013.01)

(58) Field of Classification Search
CPC ............. H02J 50/20; H02J 50/23; H02J 50/27
See application file for complete search history.

(56) References Cited

U.S. PATENT DOCUMENTS

2017/0093195 A1* 3/2017 Lee ........................ H02J 50/60
2017/0343648 A1* 11/2017 Trotta ................... G01S 13/584
2018/0352526 A1* 12/2018 Frenger ............. H04W 56/0035
2019/0348853 A1* 11/2019 Swan ..................... H02J 50/10
2020/0212719 A1* 7/2020 Huang ................... H02J 50/12
2021/0036560 A1* 2/2021 Park ..................... H02J 50/402
2021/0344233 A1* 11/2021 Green .................. H02J 50/005

FOREIGN PATENT DOCUMENTS

JP 2017-187852 A 10/2017

* cited by examiner

*Primary Examiner* — Wen W Huang
(74) *Attorney, Agent, or Firm* — Studebaker Brackett PLLC

(57) ABSTRACT

An electronic device according to an aspect includes: a transmitter (13) that transmits a radio wave; a receiver (14) that receives a radio wave; an estimator (15) that estimates, using a prescribed signal included in the received radio wave, a movement speed of a reception device and/or a speed varying in a propagation path between a main device and the reception device; a determiner (18A) that determines, using the estimated speed, a transmission cycle of the prescribed signal; and an instructor (18B) that provides an instruction regarding the determined transmission cycle to the reception device in accordance with a value obtained by shifting a center frequency of the radio wave to be transmitted in a channel allocated for power supply.

8 Claims, 6 Drawing Sheets

| ESTIMATED VALUE OF MOVEMENT SPEED [km/h] | TRANSMISSION CYCLE OF PRESCRIBED SIGNAL [msec] |
|---|---|
| 0～4 | A1 |
| 4～10 | A2 |
| 10～30 | A3 |
| 30～60 | A4 |
| 60over | A5 |

| ESTIMATED VALUE OF MOVEMENT SPEED [km/h] | TRANSMISSION CYCLE OF PRESCRIBED SIGNAL [msec] | DISPLACEMENT AMOUNT OF CENTER FREQUENCY [Hz] |
|---|---|---|
| 0～4 | A1 | F1 |
| 4～10 | A2 | F2 |
| 10～30 | A3 | F3 |
| 30～60 | A4 | F4 |
| 60over | A5 | F5 |

ELECTRONIC DEVICE, WIRELESS POWER TRANSMISSION SYSTEM, CONTROL METHOD, AND CONTROL PROGRAM

TECHNICAL FIELD

The present application relates to an electronic device, a wireless power transmission system, a control method, and a control program.

BACKGROUND OF INVENTION

Patent Document 1 discloses an optical communication apparatus in which a transmission cycle of an uplink signal to an optical communication path side device is set to be shorter as a traveling speed of a moving body increases while a transmission interval of the uplink signal is set to be longer as the traveling speed decreases.

CITATION LIST

Patent Literature

Patent Document 1: JP 2017-187852 A

SUMMARY

Problem to be Solved

In the related art, since processing is executed of changing a transmission cycle at a transmission side at which an uplink signal is transmitted, a configuration for performing complicated processing at the transmission side is required. Therefore, there is room to improve a time and/or a frequency of transmission of an uplink signal from a power-supplied device (reception device) to a transmission device in wireless power transmission from the viewpoint of energy efficiency.

Solution to Problem

An electronic device according to an aspect includes: a transmitter that transmits a radio wave; a receiver that receives a radio wave; an estimator that estimates, using a prescribed signal included in the received radio wave, a movement speed of a reception device and/or a speed varying in a propagation path between a main device and the reception device; a determiner that determines, using the estimated speed, a transmission cycle of the prescribed signal; and an instructor that provides an instruction regarding the determined transmission cycle time to the reception device in accordance with a value obtained by shifting a center frequency of the radio wave to be transmitted in a channel allocated for power supply.

A wireless power transmission system according to an aspect includes: an electronic device; and a power-supplied device that is supplied with power through a radio wave received from the electronic device. The electronic device includes: a transmitter that transmits a radio wave; a receiver that receives a radio wave; an estimator that estimates, using a prescribed signal included in the received radio wave, a movement speed of a reception device and/or a speed varying in a propagation path between a transmission device and the reception device; a determiner that determines, using the estimated speed, a transmission cycle of the prescribed signal; and an instructor that provides an instruction regarding the determined transmission cycle to the reception device in accordance with a value obtained by shifting a center frequency of the radio wave to be transmitted in a channel allocated for power supply. The power-supplied device includes: a second transmitter that transmits the prescribed signal to the electronic device; and a second controller that sets the transmission cycle of the prescribed signal based on the center frequency of the received radio wave.

A control method according to an aspect includes: performed by an electronic device including a transmitter that transmits a radio wave and a receiver that receives a radio wave, estimating, using a prescribed signal included in the received radio wave, a movement speed of a reception device and/or a speed varying in a propagation path between a transmission device and the reception device; determining, using the estimated speed, a transmission cycle of the prescribed signal; and providing an instruction regarding the determined transmission cycle to the reception device in accordance with a value obtained by shifting a center frequency of the radio wave to be transmitted in a channel allocated for power supply.

A control program according to an aspect causes an electronic device including a transmitter that transmits a radio wave and a receiver that receives a radio wave to execute: estimating, using a prescribed signal included in the received radio wave, a movement speed of a reception device and/or a speed varying in a propagation path between a transmission device and the reception device; determining, using the estimated speed, a transmission cycle of the prescribed signal; and providing an instruction regarding the determined transmission cycle to the reception device in accordance with a value obtained by shifting a center frequency of the radio waves to be transmitted in a channel allocated for power supply.

DESCRIPTION OF EMBODIMENTS

A plurality of embodiments for implementing an electronic device, a wireless power transmission system, a control method, a control program, and the like according to the present application will be described in detail with reference to the drawings. Note that the present application is not limited by the following description. Constituent elements in the following description include those that can be easily assumed by a person skilled in the art, those that are substantially identical to the constituent elements, and those within a so-called range of equivalents. In the following description, the same reference signs may be assigned to the same constituent elements. Overlapping description may be omitted.

Figure 1:
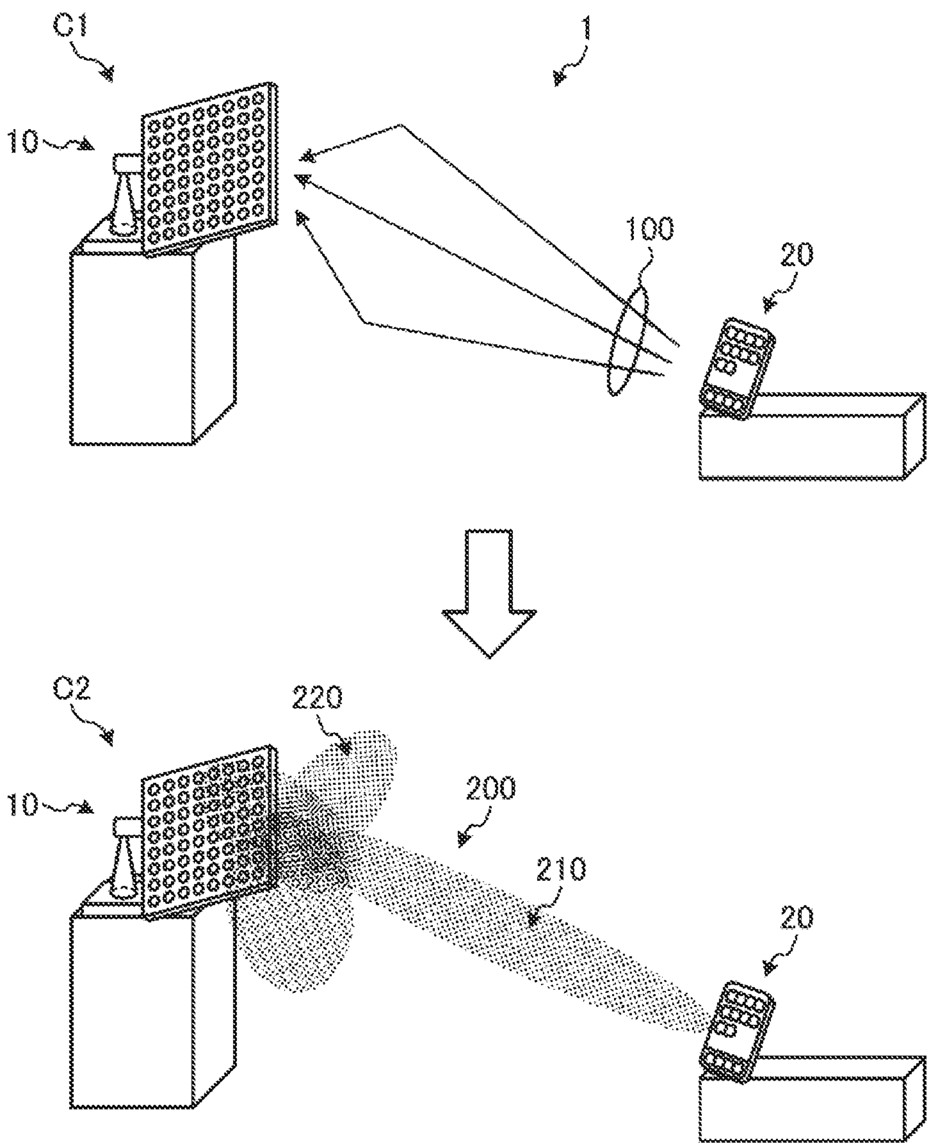
FIG. 1 is a diagram for describing an overview of a wireless power transmission system according to an embodiment.

FIG. 1 is a diagram for describing an overview of a wireless power transmission system according to an embodiment. A system 1 illustrated in FIG. 1 includes, for example, a wireless power transmission system capable of performing microwave transmission type (space transmission type) wireless power transmission. Wireless power transmission is a mechanism capable of transmitting power without using, for example, a cable or a plug. Since the microwave transmission type system 1 uses radio waves (microwaves) for energy transmission, the system 1 uses unmodulated waves in narrow frequency bands. The system 1 transmits power in a plurality of frequency bands, for example. The plurality of frequency bands include, for example, 920 MHz, 2.4 GHZ, and 5.7 GHz in Japan. In the present embodiment, the system 1 enables both improvement in power supply efficiency suited to the situation and assurance of safety to be achieved. The system 1 can be applied to, for example, space-based solar generation.

In the example illustrated in FIG. 1, the system 1 includes a master device 10 and a slave device 20. The master device 10 is a transmission device that transmits power in a wireless manner in the system 1. The master device 10 is a device capable of transmitting radio waves for power supply. The master device 10 is an example of an electronic device. The master device 10 may use, for example, a Multiple-Input Multiple-Output (MIMO) antenna technology. In MIMO, antenna elements at each end of a communication circuit are combined to minimize errors and optimize data rates. In the following description, the master device 10 may be described as a "main device".

The slave device 20 is a power-supplied device that receives radio waves for power supply and obtains power in the system 1. Examples of the slave device 20 include a smartphone, a tablet terminal, an Internet of Things (IoT) sensor, a laptop personal computer, a drone, an electric vehicle, electric bicycles, game machines, and the like. In the system 1, a direction from the slave device 20 to the master device 10 will be referred to as uplink, and a direction from the master device 10 to the slave device 20 will be referred to as downlink. The system 1 can manage utilization of radio waves in a time division manner, a frequency division manner, or the like so that the radio waves do not interfere with each other.

In a scene C1, the slave device 20 can transmit a prescribed signal 100 to a master device 10. The prescribed signal 100 includes, for example, a beacon, and a pilot signal. The slave device 20 can transmit the prescribed signal 100 in a transmission cycle, for example. The slave device 20 can transmit the prescribed signal 100 by emitting radio waves including the prescribed signal 100. On the other hand, once the master device 10 receives the prescribed signal 100, the master device 10 estimates the position of the slave device 20 based on the prescribed signal. The master device 10 calculates a weight coefficient for transmission with respect to the estimated position of the slave device 20.

In a scene C2, the master device 10 performs directivity control on each antenna by multiplying the weight coefficient, and transmits radio waves of a transmission signal 200 for power supply. The directivity control means, for example, controlling a relationship between a radiation direction and a radiation intensity of the radio waves. Thus, the master device 10 radiates the radio waves in a radiation pattern having the radiation directivity. The master device 10 can radiate (transmit) the radio waves of the transmission signal 200 with a main lobe 210 directed to the slave device 20 and a side lobe 220 directed in a direction away from the slave device 20. The main lobe 210 indicates the strongest beam of the radiated radio waves of the transmission signal 200. The side lobe 220 indicates a beam other than the main lobe 210.

In the system 1, both the master device 10 (power transmission device) and the slave device 20 (power reception device) are required to recognize a change in transmission cycle in order to change the uplink transmission cycle. The system 1 is required to provide a notification of an instruction to change the uplink transmission cycle through communication so that radio waves do not interfere with each other. In the system 1, a prescribed signal 100 for which a propagation path can be estimated may be transmitted in a short period of time and less frequently in regard to the uplink from the slave device 20 to the master device 10 from the viewpoint of energy efficiency. However, information communication other than the prescribed signal 100 in order to provide the notification of the instruction to change the uplink transmission cycle from the slave device 20 to the master device 10 not only increases the utilization time of the uplink but also consumes power of the slave device 20. Downlink transmission from the master device 10 to the slave device 20 may be performed using only radio waves for power supply in the system 1. In the system 1, modulation for the instruction to change the uplink transmission cycle from the master device 10 to the slave device 20 and using radio waves require temporary stopping utilization of the radio waves for power supply and lead to a reduction in energy efficiency. As described above, the system 1 according to the present embodiment provides a function of controlling a transmission cycle of the prescribed signal 100 from the master device 10 to the slave device 20.

Figure 2:
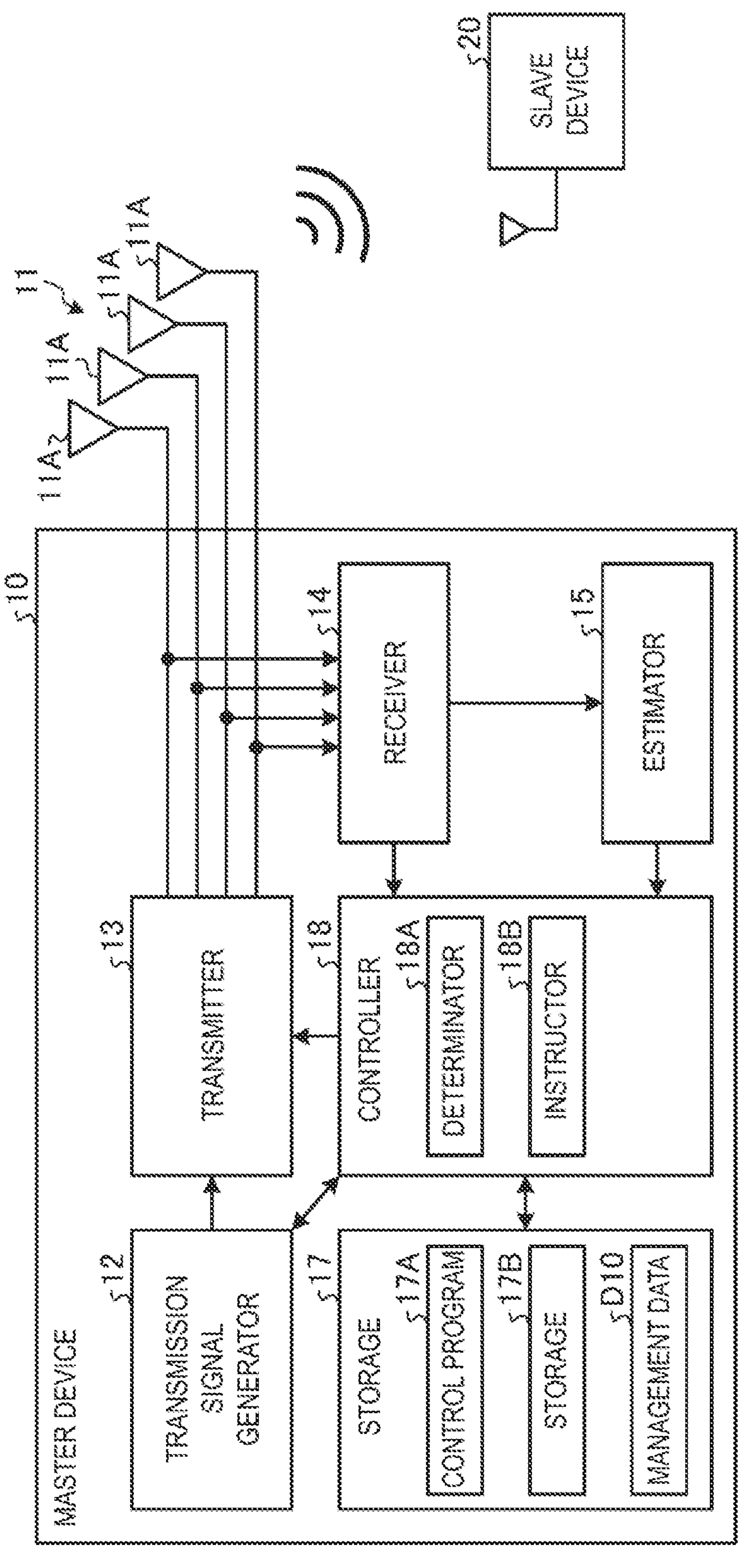
FIG. 2 is a diagram illustrating an example of a configuration of a master device according to the embodiment.

FIG. 2 is a diagram illustrating an example of a configuration of the master device 10 according to the embodiment. As illustrated in FIG. 2, the master device 10 includes an antenna 11, a transmission signal generator 12, a transmitter 13, a receiver 14, an estimator 15, a storage 17, and a controller 18. The controller 18 is electrically connected to the transmission signal generator 12, the transmitter 13, the receiver 14, the estimator 15, the storage 17, and the like. Although a case where the antenna 11 includes four antenna elements 11A in the master device 10 will be described in the present embodiment in order to simplify the description, the number of antenna elements 11A is not limited thereto.

The antenna 11 is capable of performing directivity control (beam forming). The antenna 11 is an antenna array including the plurality of antenna elements 11A. The antenna 11 is capable of strengthening radio waves in a specific direction and causing the radio waves to cancel out each other and weaken the radio waves in other directions, by each of the plurality of antenna elements 11A emitting the same radio waves and by adjusting each phase and power intensity, for example. The antenna 11 emits radio waves including the transmission signal 200 and receives radio waves including a signal from a slave device 20. The antenna 11 supplies the received signal to the receiver 14. The antenna 11 is adapted such that a direction in which radiation with radio waves is maximized is the main lobe

210. The antenna 11 is adapted such that a direction intersecting the main lobe 210 is the side lobe 220.

The transmission signal generator 12 generates the transmission signal 200 for power supply obtained by converting a current to be fed to the slave device 20 into radio waves. The transmission signal 200 is a signal for transmitting radio waves capable of supplying power. The transmission signal generator 12 converts a current from a power source into radio waves of a transmission frequency to generate the transmission signal 200. Examples of the power source include a commercial power source, a DC power source, and a battery. The transmission signal generator 12 transmits the generated transmission signal 200 to the transmitter 13.

The transmitter 13 is electrically connected to the plurality of antenna elements 11A of the antenna 11. The transmitter 13 causes the antenna 11 to emit radio waves including the transmission signal 200 for power supply. The transmitter 13 applies a weight corresponding to a beam that can be formed by the plurality of antenna elements 11A to cause the plurality of antenna elements 11A to emit radio waves in a specific direction. The transmitter 13 applies the weight designated by the controller 18 to the plurality of antenna elements 11A.

The receiver 14 is electrically connected to the plurality of antenna elements 11A of the antenna 11, the estimator 15, and the like. The receiver 14 extracts a reception signal from the radio waves from the slave device 20 received via the antenna 11. The reception signal includes, for example, the prescribed signal 100 described above. The receiver 14 supplies the extracted reception signal to the estimator 15, the controller 18, and the like.

The estimator 15 estimates, using the prescribed signal 100 included in the received reception signal, a movement speed of the slave device 20 (reception device) and/or a speed varying in a propagation path between the master device 10 and the slave device 20. The propagation path is a transmission path of radio waves between the master device 10 and the slave device 20. The estimator 15 estimates a speed in accordance with a movement of the slave device 20 based on the amount of variation in a cycle of the prescribed signal 100 and a change in environment of the propagation path, for example. The estimator 15 estimates a condition of radio wave propagation in the space between the master device 10 and the slave device 20, for example. The estimator 15 estimates a reception response vector (terminal arrival direction) from the reception signal. The estimator 15 estimates the condition of radio wave propagation using the reception level of the prescribed signal 100, a sensitivity, a propagation model, a machine learning program, and the like to recognize the condition of radio wave propagation in the space, for example. The estimator 15 supplies an estimation result based on the prescribed signal 100 to the controller 18.

The storage 17 can store a program and data. The storage 17 may include a non-transitory storage medium of choice such as a semiconductor storage medium or a magnetic storage medium. The storage 17 may include a combination of a storage medium such as a memory card, an optical disc, or a magneto-optical disk, and a device for reading the storage medium. The storage 17 may include a storage device used as a temporary storage area such as a RAM.

The storage 17 can store a control program 17A, management data D10, and the like. The storage 17 may include a saver 17B that saves a relational expression indicating a value relationship between the estimated speed and the value by which the center frequency of radio waves to be transmitted is to be shifted. An instructor 18B may provide an instruction based on the relational expression. Although a function such as $F=aV+b$ or $F=Av\times V+bV+c$, where V denotes the estimated speed, F denotes the value by which the center frequency of the radio waves to be transmitted is to be shifted, and a, b, and c are predetermined constants can be employed as this relational expression, another relational expression may be used. The control program 17A can provide functions for implementing processing related to various operations of the master device 10. The control program 17A can provide various functions related to wireless power transmission. The management data D10 includes, for example, data with which a relationship between the speed estimated by the estimator 15 and the transmission cycle of the prescribed signal 100 can be identified. An example of the management data D10 will be described later. The storage 17 stores, for example, data with which the current transmission cycle of the prescribed signal 100 in the system 1 can be identified.

The controller 18 includes one or more computing devices. Although the computing devices include, for example, a Central Processing Unit (CPU), a System-on-a-Chip (SoC), a Micro Control Unit (MCU), a Field-Programmable Gate Array (FPGA), and a coprocessor, the computing devices are not limited thereto. The controller 18 realizes processing related to various operations of the master device 10 by causing the computing devices to execute the control program 17A. The controller 18 may realize at least some of the functions provided by the control program 17A by a dedicated integrated circuit (IC).

The controller 18 includes, for example, functional units such as a determiner 18A and the instructor 18B. The controller 18 realizes each of the functional units such as the determiner 18A and the instructor 18B by executing the control program 17A.

The determiner 18A determines, using the speed estimated by the estimator 15, the transmission cycle of the prescribed signal 100. The determiner 18A determines the transmission cycle of the prescribed signal 100 based on the estimated speed and the management data D10, for example. The determiner 18A may input the estimated speed to a machine learning program, for example, and determine the output value output by the machine learning program as a transmission cycle. The determiner 18A stores the determined transmission cycle in the storage 17.

The instructor 18B provides an instruction regarding the transmission cycle of the prescribed signal 100 determined by the determiner 18A to the reception device in accordance with a value obtained by shifting a center frequency of radio waves to be transmitted in a channel allocated for power supply. The channel means a frequency width required to transmit and receive data between the master device 10 and the slave device 20. The center frequency is a frequency at the center of the frequency band of the channel. The center frequency is a frequency of power supply radio waves where a power transmission signal is arranged. The instructor 18B shifts the center frequency of the radio waves (power supply radio waves) such that the center frequency is contained within the channel allocated for power supply when an uplink transmission cycle is to be changed. The shift width of the center frequency corresponds to a small displacement amount such that the displacement is contained within the channel allocated for wireless power supply, for example. In other words, the instructor 18B causes the shift width of the center frequency and the displacement amount of the uplink transmission cycle to correspond to each other. Shifting the center frequency includes shifting the frequency of the radio waves for power supply.

When the frequency count is not changed with respect to the current transmission cycle of the prescribed signal 100, for example, the instructor 18B transmits radio waves for downlink power supply at the original center frequency without shifting the center frequency of the radio waves for power supply to be used for the downlink. When the frequency count is lowered with respect to the current transmission cycle, for example, the instructor 18B shifts the center frequency of the radio waves for power supply to be used for the downlink to the lower side. When the frequency count is raised with respect to the current transmission cycle, for example, the instructor 18B shifts the center frequency of the radio waves for power supply to be used for the downlink to the higher side. The radio waves for power supply emitted by the master device 10 thus enables an instruction regarding the transmission cycle, which is an uplink frequency count, to be provided as a notification caused by the shift in the center frequency at the same time as arrival at the slave device 20 (power-supplied device).

The functional configuration example of the master device 10 according to the present embodiment has been described above. Note that the configuration described above using FIG. 2 is merely an example and the functional configuration of the master device 10 according to the present embodiment is not limited to the example. The functional configuration of the master device 10 according to the present embodiment can be flexibly modified in accordance with the specifications and application of the master device 10.

Figure 3:
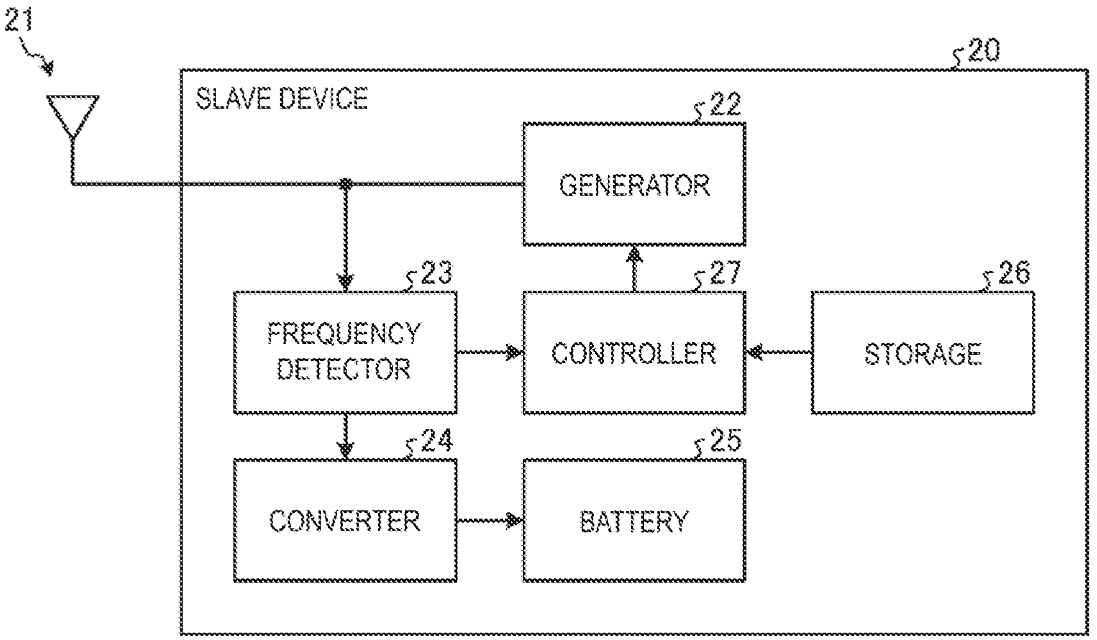
FIG. 3 is a diagram illustrating an example of a configuration of a slave device according to the embodiment.

FIG. 3 is a diagram illustrating an example of a configuration of the slave device 20 according to the embodiment. As illustrated in FIG. 3, the slave device 20 includes an antenna 21, a generator 22, a frequency detector 23, a converter 24, a battery 25, a storage 26, and a controller 27. The controller 27 is electrically connected to the generator 22, the frequency detector, the storage 26, and the like.

The antenna 21 is electrically connected to the generator 22 and the frequency detector 23. The antenna 21 emits radio waves including the prescribed signal 100 and receives radio waves including a signal from the master device 10, for example. The antenna 21 supplies the received radio waves to the frequency detector 23.

The generator 22 generates the prescribed signal 100 and causes the antenna 21 to emit radio waves including the prescribed signal 100. The generator 22 generates the prescribed signal 100 based on the transmission cycle. The generator 22 functions as a second transmitter that transmits the prescribed signal to the electronic device. The generator 22 may be configured to generate a signal different from the prescribed signal 100.

The frequency detector 23 detects a shift in the center frequency of the radio waves received via the antenna 21 in the channel for the radio waves for power supply. The frequency detector 23 detects the displacement amount of the center frequency and stores the displacement amount in the storage 26. The frequency detector 23 supplies a signal of the radio waves received via the antenna 21 to the converter 24.

The converter 24 is electrically connected to the frequency detector 23 and the battery 25. The converter 24 converts the radio waves received by the antenna 21 into a DC current and charges the battery 25 using the DC current. The converter 24 converts the radio waves into the DC current using a known rectification circuit or the like, for example.

The battery 25 is electrically connected to the converter 24. The battery 25 includes a rechargeable battery. The battery 25 includes, for example, a battery compatible with Qi (an international standard for wireless power supply). The battery 25 can supply the stored power to each component or the like that requires power in the slave device 20.

The storage 26 can store a program and data. The storage 26 may include an arbitrary non-transitory storage medium such as a semiconductor storage medium or a magnetic storage medium. The storage 26 may include a combination of a storage medium such as a memory card, an optical disc, or a magneto-optical disk and a device for reading the storage medium. The storage 26 may include a storage device used as a temporary storage area such as a RAM.

The controller 27 includes one or more computing devices. Although the computing devices include a CPU, an SoC, an MCU, an FPGA, and a coprocessor, for example, the computing devices are not limited thereto. The controller 27 realizes processing related to the various operations of the slave device 20 by causing the computing devices to execute programs. The controller 27 can provide a function of setting the transmission cycle of the prescribed signal 100 based on the center frequency of the received radio waves. The controller 27 can provide a function of controlling transmission of the prescribed signal 100 in the transmission cycle set based on the displacement amount of the center frequency in the channel allocated for power supply, for example. The controller 27 is an example of a second controller.

The functional configuration example of the slave device 20 according to the present embodiment has been described above. Note that the configuration described above using FIG. 3 is merely an example and the functional configuration of the slave device 20 according to the present embodiment is not limited thereto. The functional configuration of the slave device 20 according to the present embodiment can be flexibly modified in accordance with the specifications and application of the slave device 20.

Figure 4:
FIG. 4 is a diagram illustrating an example of management data according to the embodiment.

FIG. 4 is a diagram illustrating an example of management data D10 according to the embodiment. The management data D10 illustrated in FIG. 4 includes data for determining the uplink frequency count, that is, the transmission cycle of the prescribed signal 100 based on the movement speed of the slave device 20. The management data D10 has a structure with which a relationship between the estimated value of the movement speed of the slave device 20 and the transmission cycle of the prescribed signal 100 can be identified.

For example, since energy efficiency is considered as being important in the wireless power supply system, the time of the uplink from the slave device 20 (power-supplied device) is preferably as short as possible, while the time of the downlink from the master device 10 is preferably allocated to be as long as possible. Power consumption can also be reduced for transmission of the slave device 20 in the wireless power supply system if the uplink frequency count is also as small as possible.

When the slave device 20 is fixed and the surrounding environment is stopped in the wireless power supply system, the beam forming from the master device 10 does also not cause directional deviation, and a decrease in uplink frequency count (an increase in uplink cycle) affects energy efficiency little. On the other hand, when the slave device 20 is moving, or when the surrounding environment of the master device 10 is moving, radio wave propagation properties between the master device 10 and the slave device 20 in the system 1 change moment by moment. This leads to a reduction in energy efficiency since the beam forming direction from the master device 10 deviates if the uplink frequency count is small (the transmission cycle is long) in the system 1. The master device 10 thus appropriately controls the uplink frequency count (transmission cycle) of the slave device 20 in the system 1.

In the example illustrated in FIG. 4, the slave device 20 is likely not moving if the estimated value of the movement speed is 0 to 4 km/h, and the transmission cycle is thus set to A1 in the management data D10. In the present embodiment, the system 1 uses the transmission cycle A1 as a standard cycle. In the management data D10, the transmission cycle is set to A2 when the estimated value of the movement speed is 4 to 10 km/h, the transmission cycle is set to A3 when the estimated value of the movement speed is 10 to 30 km/h, the transmission cycle is set to A4 when the estimated value of the movement speed is 30 to 60 km/h, and the transmission cycle is set to A5 when the estimated value of the movement speed is greater than 60 km/h. Values less than the transmission cycle A1 are set as the transmission cycles A2, A3, A4, and A5 in order as the movement speed of the slave device 20 increases. In other words, values are set in the management data D10 such that a frequency count of the transmission cycle increases as the movement speed of the slave device 20 increases. Mutually different values that lead to appropriate uplink frequency counts are set as the transmission cycle A1 to the transmission cycle A5 of the management data D10.

Figure 5:
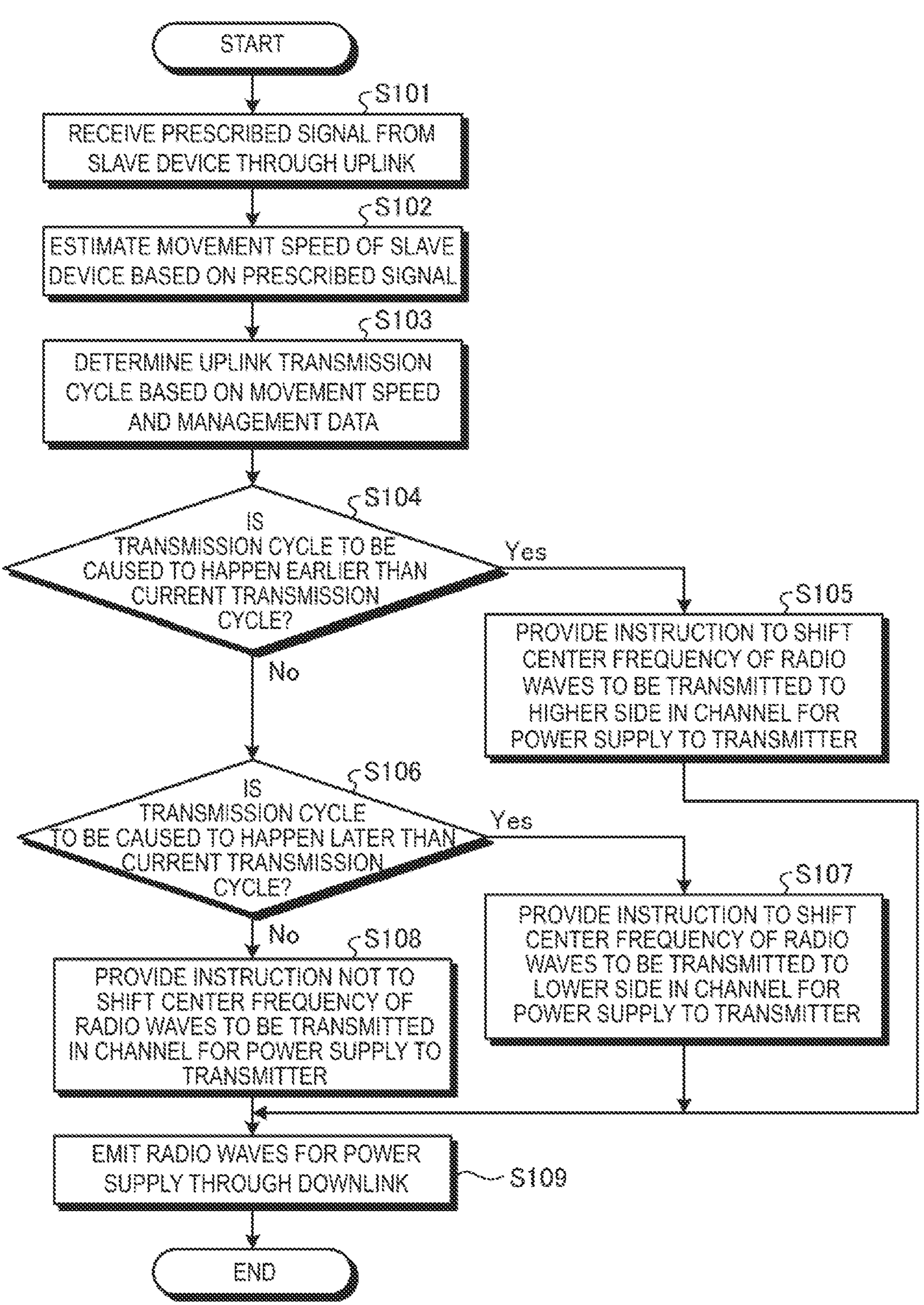
FIG. 5 is a flowchart illustrating an example of a processing procedure executed by the master device according to the embodiment.
Figure 6:
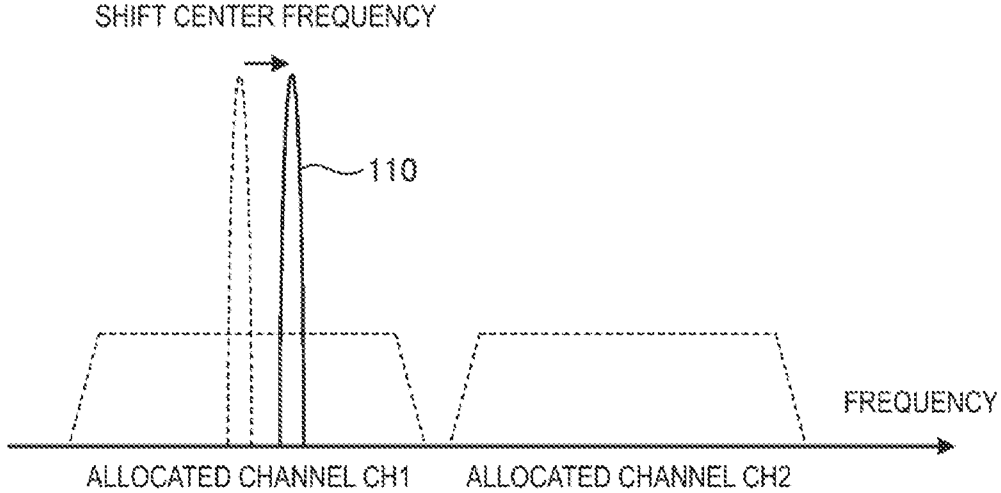
FIG. 6 is a diagram for describing relationships between associated channels and center frequencies according to the embodiment.

FIG. 5 is a flowchart illustrating an example of a processing procedure executed by the master device 10 according to the embodiment. FIG. 6 is a diagram for explaining relationships between allocated channels and center frequencies according to the embodiment. The processing procedure illustrated in FIG. 5 is implemented by the controller 18 of the master device 10 executing the control program 17A. The processing procedure illustrated in FIG. 5 is repeatedly executed by the controller 18 at a timing of radio wave reception when the radio waves are received by the antenna 11, for example.

As illustrated in FIG. 5, the controller 18 of the master device 10 receives the prescribed signal 100 through the uplink from the slave device 20 (Step S101). For example, the controller 18 receives the prescribed signal 100 of the radio waves via the antenna 11. Upon completion of the processing in step S101, the controller 18 causes the processing to proceed to step S102.

The controller 18 estimates the movement speed of the slave device 20 based on the prescribed signal 100 (Step S102). For example, the controller 18 compares this prescribed signal 100 with a previous prescribed signal 100, estimates the movement speed of the slave device 20 based on the displacement amount of the transmission cycle, and stores the estimated movement speed in the storage 17. Upon completion of the processing in step S102, the controller 18 causes the processing to proceed to step S103.

The controller 18 determines the uplink transmission cycle based on the movement speed and the management data D10 (Step S103). For example, the controller 18 determines the transmission cycle corresponding to the movement speed estimated in Step S102 from the management data D10 and stores the determined transmission cycle in the storage 17. For example, the controller 18 determines a smaller value as the transmission cycle as the movement speed of the slave device 20 increases. Once the processing in Step S103 ends, the controller 18 moves on to the processing in Step S104.

The controller 18 determines whether to cause the transmission cycle to happen earlier than the current one (Step S104). When the transmission cycle determined in Step S103 is a cycle earlier than the current transmission cycle, for example, the controller 18 determines that the transmission cycle is to be caused to happen earlier than the current one. When the transmission cycle is determined to be caused to happen earlier than the current one (Yes in Step S104), the controller 18 moves on to the processing in Step S105.

The controller 18 provides an instruction to shift the center frequency of the radio waves to be transmitted to the higher side to the transmitter 13 in the channel for power supply (Step S105). For example, the controller 18 provides an instruction to shift the center frequency to the high frequency side by an amount corresponding to a predetermined frequency to the transmitter 13. The predetermined frequency is, for example, a frequency set in advance in the system 1. As illustrated in FIG. 6, the master device 10 emits radio waves including an allocated channel CH1 and an allocated channel CH2 from the antenna 11. The allocated channel CH1 is a channel allocated for power supply. The center frequency of the allocated channel CH1 is a radio wave 110 for power supply. The allocated channel CH2 is a channel that has not been allocated for power supply. The controller 18 provides an instruction regarding a change in transmission cycle to the slave device 20 by shifting the radio wave 110 for power supply from the center frequency from the center of the allocated channel CH1. In the example illustrated in FIG. 6, the controller 18 shifts the radio wave 110 for power supply from the center frequency to the high frequency side by the amount corresponding to the predetermined frequency in order to cause the transmission cycle to happen earlier. Returning to FIG. 5, once the processing in Step S105 ends, the controller 18 moves on to processing in Step S109, which will be described later.

When the transmission cycle is determined not to be caused to happen earlier than the current one (No in Step S104), the controller 18 moves on to the processing in Step S106. The controller 18 determines whether to cause the transmission cycle to happen later than the current one (Step S106). When the transmission cycle determined in Step S103 is a cycle later than the current transmission cycle, for example, the controller 18 determines that the transmission cycle is caused to happen later than the current transmission cycle. When the transmission cycle is determined to be caused to happen later than the current one (Yes in Step S106), the controller 18 moves on to the processing in Step S107.

The controller 18 provides an instruction to shift the center frequency of the radio waves to be transmitted to the lower side in the channel for power supply to the transmitter 13 (Step S107). For example, the controller 18 provides an instruction to shift the center frequency to the low frequency side by the amount corresponding to the predetermined frequency to the transmitter 13 in order to cause the transmission cycle of the prescribed signal 100 to happen later. In an example illustrated in FIG. 6, the low frequency side is a left direction in the allocated channel CH1. Returning to FIG. 5, once the processing in Step S107 ends, the controller 18 moves on to the processing in Step S109, which will be described later.

Note that the controller 18 may provide an instruction to shift the center frequency of the radio waves to be transmitted to the lower side in the channel for power supply to the transmitter 13 when the transmission cycle is determined to be caused to happen earlier than the current one, and may provide an instruction to shift the center frequency of the radio waves to be transmitted to the higher side in the channel for power supply to the transmitter 13 when the transmission cycle is determined to be caused to happen later than the current one. The controller 18 may provide an instructor to shift the center frequency of the radio waves to be transmitted to the lower side within a first predetermined band range in the channel for power supply to the transmitter 13 when the transmission cycle is determined to be caused to happen earlier than the current one, and may provide an instruction to shift the center frequency of the radio waves to be transmitted to the lower side within the second predetermined band range that is different from the first predetermined band in the channel for power supply to the transmitter 13 when the transmission cycle is determined to be caused to happen later than the current one. The controller 18 may provide an instruction to shift the center frequency of the radio waves to be transmitted to the higher side within the first predetermined band range in the channel for power supply to the transmitter 13 when the transmission cycle is determined to be caused to happen earlier than the current transmission cycle, and may provide an instruction to shift the center frequency of the radio waves to be transmitted to the higher side within the second predetermined band range that is different from the first predetermined band in the channel for power supply to the transmitter 13 when the transmission cycle is determined to be caused to happen later than the current one.

When the transmission cycle is determined not to be caused to happen later than the current one (No in Step S106), the controller 18 moves on to the processing in Step S108 since the transmission cycle is not changed. The controller 18 provides an instruction not to shift the center frequency of the radio waves to be transmitted in the channel for power supply to the transmitter 13 (Step S108). For example, the controller 18 provides an instruction to locate the radio waves for power supply at the center in the channel for power supply to the transmitter 13. The transmitter 13 can thus set the radio waves for power supply at the center frequency in the channel for power supply when the radio waves for power supply have been shifted from the center frequency. Once the processing in Step S108 ends, the controller 18 moves on to the processing in Step S109.

The controller 18 emits radio waves for power supply through the downlink (Step S109). For example, the controller 18 causes the transmitter 13 to emit radio waves including the transmission signal 200 by providing an instruction to generate the transmission signal 200 for power supply to the transmission signal generator 12. In this case, the transmitter 13 emits radio waves such that it emits radio waves for power supply at the designated frequency in the channel for power supply. Once the processing in Step S109 ends, the controller 18 causes the processing procedure illustrated in FIG. 5 to end.

Figure 7:
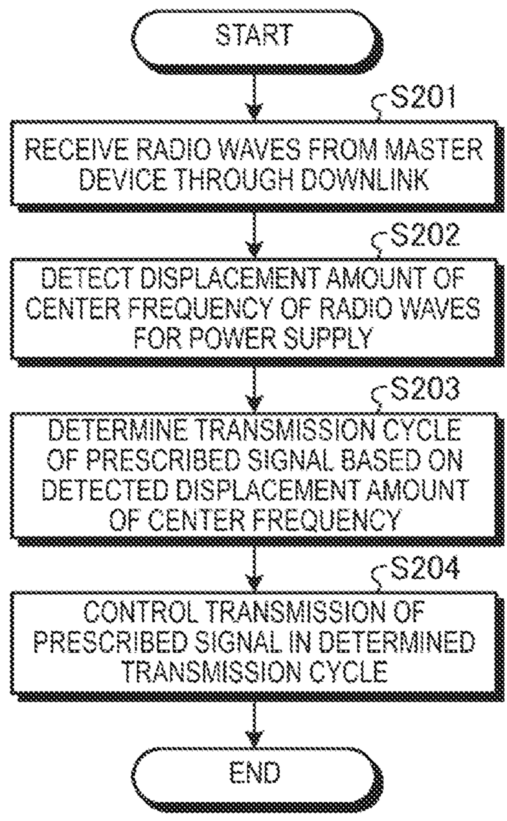
FIG. 7 is a flowchart illustrating an example of a processing procedure executed by the slave device according to the embodiment.

FIG. 7 is a flowchart illustrating an example of a processing procedure executed by the slave device 20 according to the embodiment. The processing procedure illustrated in FIG. 7 is implemented by the controller 27 of the slave device 20 executing a program. The processing procedure illustrated in FIG. 7 is repeatedly executed by the controller 27 in a case where the antenna 21 has received radio waves, for example.

As illustrated in FIG. 7, the controller 27 of the slave device 20 receives radio waves from the master device 10 through the downlink (Step S201). For example, the controller 18 receives radio waves from the master device 10 via the antenna 21. Once the processing in Step S201 ends, the controller 27 moves on to the processing in Step S202.

The controller 27 detects the displacement amount of the center frequency of the radio waves for power supply (Step S202). For example, the controller 27 detects the displacement amount of the center frequency based on a difference between the radio wave for power supply in the channel for power supply of the received radio waves and the center frequency and stores the detected displacement amount in the storage 26. Once the processing in Step S202 ends, the controller 27 moves on to the processing in Step S203.

The controller 27 determines the transmission cycle of the prescribed signal 100 based on the detected displacement amount of the center frequency (Step S203). For example, the controller 27 determines the transmission cycle based on whether the displacement amount detected in Step S202 has increased, decreased, or not changed. If the displacement amount has increased, that is, if the center frequency of the radio waves has been shifted to the higher side, the controller 27 determines a cycle to cause the transmission cycle of the prescribed signal 100 to happen earlier. The cycle that is caused to happen earlier includes a cycle obtained by subtracting a predetermined time from the current transmission cycle, for example. If the amount of deviation has decreased, that is, the center frequency of the radio waves has been shifted to the lower side, the controller 27 determines a cycle to cause the transmission cycle of the prescribed signal 100 to happen later. The cycle that is caused to happen later includes a cycle obtained by adding a predetermined time to the current transmission cycle, for example. If no displacement amount is present, that is, if the center frequency of the radio waves has not been shifted, the controller 27 determines the current transmission cycle as the transmission cycle of the prescribed signal 100. Once the processing in Step S203 ends, the controller 27 moves on to Step S204.

The controller 27 controls transmission of the prescribed signal 100 in the determined transmission cycle (Step S204). For example, the controller 27 causes the antenna 21 to emit radio waves including the prescribed signal 100 in the transmission cycle by providing an instruction to generate the prescribed signal 100 to the generator 22 at a timing at which the transmission cycle arrives from the previous transmission. Once the processing in Step S204 ends, the controller 27 ends the processing procedure illustrated in FIG. 7.

In the system 1 according to the embodiment, the master device 10 estimates movement of the slave device 20 once the slave device 20 transmits the prescribed signal 100 to the master device 10 in the transmission cycle. Once the master device 10 estimates the movement speed of the slave device 20, the system 1 determines the transmission cycle of the prescribed signal 100 suitable for the speed. In the system 1, the master device 10 provides an instruction regarding the determined transmission cycle to the slave device 20 by the value obtained by shifting the center frequency of the radio waves to be transmitted in the channel allocated for power supply. The system 1 sets the transmission cycle of the prescribed signal 100 based on the center frequency in the allocated channel CH1 for power supply of the radio waves received by the slave device 20. The master device 10 emits the radio waves having been shifted from the center frequency to the slave device 20 until a desired transmission cycle in accordance with a moving condition of the slave device 20 relative to the main device is achieved.

The master device 10 can shift the center frequency of the radio waves for power supply to be used for the downlink to the lower side and then emit the radio waves for downlink power supply when the cycle is caused to happen later (the frequency count is lowered) with respect to the current transmission cycle of the prescribed signal 100, for example. The master device 10 can shift the center frequency of the radio waves for power supply to be used for the downlink to the higher side and then emit the radio waves for downlink power supply when the cycle is caused to happen earlier (the frequency count is raised) with respect to the current transmission cycle. The master device 10 can emit the radio waves for downlink power supply at the original center frequency without shifting the center frequency of the radio waves for power supply to be used for the downlink when the cycle is not to be changed (the frequency count is not to be changed) with respect to the current transmission cycle.

In this manner, the master device 10 can use the radio waves to be used to supply power from the main device to the slave device 20 to provide an instruction to change the transmission cycle of the prescribed signal 100 through the shift in the center frequency, and there is thus no need to provide special information communication to provide the instruction to the slave device 20. The master device 10 can realize the uplink cycle in accordance with the movement speed and can thus cause the beam forming (directivity control) applied in the wireless power transmission to be appropriately followed. As a result, the master device 10 can change the time and the frequency count of transmission of the uplink signal from the slave device 20 only by the radio waves for power supply, can thus curb a reduction in power supply efficiency, and can improve frequency utilization efficiency.

When the frequency count is not to be changed with respect to the current transmission cycle of the prescribed signal 100, the master device 10 transmits the radio waves for downlink power supply at the original center frequency without shifting the center frequency of the radio waves for power supply to be used for the downlink. Thus, there is no need for the master device 10 to perform special information communication to provide an instruction regarding the transmission cycle, and the master device 10 can provide an instruction regarding a change in transmission cycle only by the radio waves for power supply.

In the master device 10, the shift width of the center frequency of the radio waves for power supply corresponds to the displacement amount contained within the channel allocated for wireless power supply. In this manner, it is only necessary for the master device 10 to shift the center frequency of the radio waves for power supply, a reduction in power supply efficiency can thus be curbed, and frequency utilization efficiency can be improved.

There is no need for the system 1 to perform special information communication to provide an instruction to the slave device 20 since the master device 10 uses the radio waves used for power supply to the slave device 20 to provide an instruction to change the transmission cycle of the prescribed signal 100 through the shift in the center frequency. In the system 1, the master device 10 provides an instruction regarding the uplink cycle in accordance with the speed in the propagation path with the slave device 20 to the slave device 20, and beam forming (directivity control) applied in the wireless power transmission can be appropriately followed. As a result, the system 1 can change the time and the frequency count of transmission of the uplink signal from the slave device 20 only by the radio waves for power supply of the master device 10, can thus curb a reduction in power supply efficiency, and can improve frequency utilization efficiency.

Although the case where the aforementioned management data D10 indicates the relationship between the estimated value of the movement speed and the transmission cycle of the prescribed signal 100 has been described in the present embodiment, the present disclosure is not limited thereto. For example, the management data D10 allows an item of a frequency shift width of the center frequency to be added.

Figure 8:
FIG. 8 is a diagram illustrating another example of management data according to the embodiment.

FIG. 8 is a diagram illustrating another example of the management data D10 according to the embodiment. The management data D10 illustrated in FIG. 8 has a structure with which the relationship among the movement speed, the transmission cycle of the prescribed signal 100, and the displacement amount of the center frequency is identifiable. In this case, the management data D10 is stored in both the storage 17 of the master device 10 and the storage 26 of the slave device 20. The master device 10 determines the transmission cycle of the prescribed signal 100 corresponding to the estimated movement speed based on the management data D10. The slave device 20 determines the transmission cycle of the prescribed signal 100 corresponding to the displacement amount of the center frequency of the radio waves based on the management data D10.

In the example illustrated in FIG. 8, when the estimated value of the movement speed is 0 to 4 km/h, the slave device 20 is likely not moving, the transmission cycle is thus set to A1, and the displacement amount of the center frequency is set to F1, in the management data D10. When the estimated value of the movement speed is 4 to 10 km/h, the transmission cycle is set to A2, and the displacement amount of the center frequency is set to F2, in the management data D10. When the estimated value of the movement speed is 10 to 30 km/h, the transmission cycle is set to A3, and the displacement amount of the center frequency is set to F3, in the management data D10. When the estimated value of the movement speed is 30 to 60 km/h, the transmission cycle is set to A4, and the displacement amount of the center frequency is set to F4, in the management data D10. When the estimated value of the movement speed is greater than 60 km/h, the transmission cycle is set to A5, and the displacement amount of the center frequency is set to F5, in the management data D10. As the displacement amounts F2, F3, F4, and F5, values that are smaller than the displacement amount F1 are set in order as the movement speed of the slave device 20 increases. Mutually different values that lead to appropriate center frequencies are set as the displacement amount F1 to the displacement amount F5 in the management data D10.

When the cycle is to be changed with respect to the current transmission cycle, for example, the aforementioned instructor 18B of the master device 10 specifies the displacement amount of the center frequency corresponding to the movement speed based on the management data D10 and provides an instruction regarding the displacement amount of the center frequency of the radio waves for power supply to be used for the downlink to the transmitter 13. When the cycle is not to be changed with respect to the current transmission cycle, for example, the instructor 18B specifies the displacement amount F1 of the center frequency corresponding to the movement speed based on the management data D10 and provides an instruction regarding the displacement amount F1 of the center frequency of the radio waves for power supply to be used for the downlink to the transmitter 13.

The aforementioned controller 27 of the slave device 20 adds a function of specifying the transmission cycle of the prescribed signal 100 from the management data D10 based on the center frequency of the received radio waves and controlling the transmission of the prescribed signal 100 in the transmission cycle. When the displacement amount of the center frequency of the received radio waves is F1, for example, the controller 27 specifies the transmission cycle A1 from the management data D10 and controls transmission of the prescribed signal 100 in the transmission cycle A1, when the displacement amount of the center frequency of the received radio waves is F3, for example, the controller 27 specifies the transmission cycle A3 from the management data D10 and controls transmission of the prescribed signal 100 in the transmission cycle A3.

As described above, the system 1 is adapted such that both the master device 10 and the slave device 20 hold the management data D10, the master device 10 determines the transmission cycle of the prescribed signal 100 using the estimated movement speed and shifts the center frequency of the radio waves for power supply to achieve the displacement amount of the center frequency in accordance with the transmission cycle. In the system 1, the slave device 20 detects the displacement amount of the center frequency of the radio waves for power supply, determines the transmission cycle of the prescribed signal 100 with reference to the management data D10, and transmits the prescribed signal 100 to the master device 10 in the determined transmission cycle. In this manner, the master device 10 can provide an instruction regarding the value of the transmission cycle in accordance with the speed in the propagation path, and the master device 10 can thus quickly change the transmission cycle of the prescribed signal 100 in the slave device 20 in the system 1. As a result, the system 1 can quickly change the time and the frequency count of transmission of the uplink signal from the slave device 20 only by the radio waves for power supply, can thus curb a reduction in power supply efficiency, and can improve frequency utilization efficiency.

Figure 9:
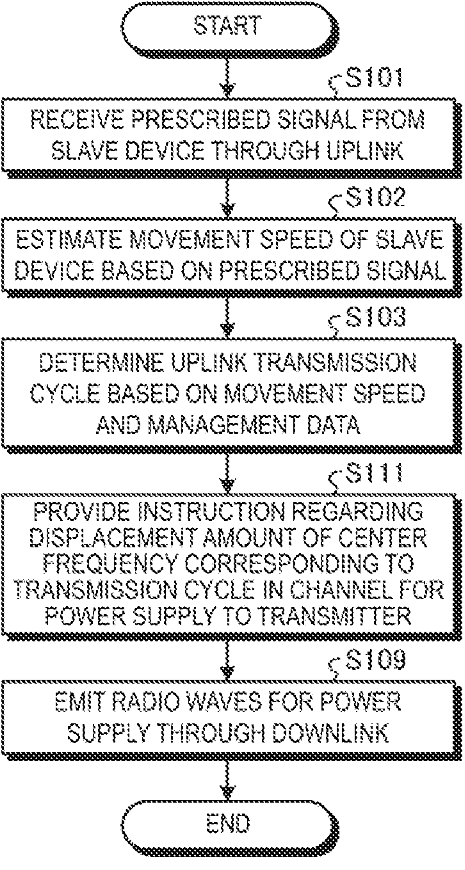
FIG. 9 is a flowchart illustrating another example of a processing procedure executed by the master device according to the embodiment.

FIG. 9 is a flowchart illustrating another example of a processing procedure executed by the master device 10 according to the embodiment. The processing procedure illustrated in FIG. 9 is implemented by the controller 18 of the master device 10 executing the control program 17A. The processing procedure illustrated in FIG. 9 is repeatedly executed by the controller 18 when the antenna 11 receives the radio waves, for example.

In the processing procedure illustrated in FIG. 9, the processing in Step S101 to Step S103 and Step S109 is the same processing as that in Step S101 to Step S103 and Step S109 illustrated in FIG. 5.

As illustrated in FIG. 9, the controller 18 of the master device 10 receives the prescribed signal 100 from the slave device 20 through the uplink (Step S101). The controller 18 estimates the movement speed of the slave device 20 based on the prescribed signal 100 (Step S102). The controller 18 determines the uplink transmission cycle based on the movement speed and the management data D10 (Step S103). Once the processing in Step S103 ends, the controller 18 moves on to the processing in Step S111.

The controller 18 provides an instruction regarding the displacement amount of the center frequency corresponding to the transmission cycle to the transmitter 13 in the channel for power supply (Step S111). For example, the controller 18 specifies the displacement amount of the center frequency corresponding to the transmission cycle from the management data D10 and provides an instruction regarding the displacement amount of the center frequency to the transmitter 13. Once the processing in Step S11*l* ends, the controller 18 moves on to the processing in Step S109, which has already been described.

The controller 18 emits radio waves for power supply through the downlink (Step S109). In this manner, the transmitter 13 emits the radio waves to achieve the designated displacement amount of the center frequency in the channel for power supply. Once the processing in Step S109 ends, the controller 18 causes the processing procedure illustrated in FIG. 5 to end.

As described above, the master device 10 can provide an instruction regarding the transmission cycle of the prescribed signal 100 to the slave device 20 at once using the management data D10 including the displacement amount of the center frequency. In this manner, the master device 10 can simplify the processing regarding a change in transmission cycle of the prescribed signal 100. The slave device 20 can transmit the prescribed signal 100 to the master device 10 in the transmission cycle determined by the master device 10 by executing the processing procedure illustrated in FIG. 7 as described above.

Although a case where the master device 10 is an electronic device in the system 1 has been described in the above embodiment, the present disclosure is not limited thereto. The electronic device may be implemented by a control device that controls a power supply device capable of emitting power supply radio waves or a computer incorporated in a power supply device, for example.

Embodiments have been described in order to fully and clearly disclose the technique according to the appended claims. However, the appended claims are not to be limited to the embodiments described above and may be configured to embody all variations and alternative configurations that those skilled in the art may make within the underlying matter set forth herein. Details of the present disclosure can be modified and amended by those skilled in the art in various manners based on the present disclosure. Therefore, the modifications and amendments are included in the scope of the present disclosure. For example, each functional component, each means, each step, or the like in each embodiment may be added to another embodiment so that no theoretical conflict occurs or may be replaced with each functional component, each means, each step, or the like in another embodiment. A plurality of functional components, means, steps, or the like may be combined into one or may be split in each embodiment. Each of the aforementioned embodiments of the present disclosure is not limited to implementation of each embodiment in the exact manner as described above, and the embodiments may be implemented by appropriately combining features or omitting some of the features.

REFERENCE SIGNS

1 System
10 Master device
11 Antenna
12 Transmission signal generator
13 Transmitter
14 Receiver
15 Estimator
17 Storage
17A Control program
17B Saver
18 Controller
18A Determiner
18B Instructor
20 Slave device
21 Antenna
22 Generator
23 Frequency detector
24 Converter
25 Battery
26 Storage

27 Controller
100 Prescribed signal
110 Radio wave for power supply
200 Transmission signal
D10 Management data

The invention claimed is:

1. An electronic device comprising:

a transmitter configured to transmit a radio wave;

a receiver configured to receive a radio wave;

an estimator configured to estimate, using a prescribed signal included in the received radio wave, a movement speed of a reception device and/or a speed varying in a propagation path between a main device and the reception device;

a determiner configured to determine, using the estimated speed, a transmission cycle of the prescribed signal; and an instructor configured to provide an instruction regarding the determined transmission cycle to the reception device, the instruction being in accordance with a value obtained by shifting a center frequency of the radio wave to be transmitted in a channel allocated for power supply.

2. The electronic device according to claim 1, wherein the instructor is configured to transmit a downlink radio wave for power supply having an original center frequency without shifting the center frequency of the radio wave for power supply to be used for a downlink when a frequency count is not changed with respect to the current transmission cycle.

3. The electric device according to claim 1, wherein a shift width of the center frequency is a displacement amount that is contained within a channel allocated for wireless power supply.

4. The electronic device according to claim 1, comprising:

a storage configured to store management data indicating a relationship between the estimated speed and a value by which the center frequency of the radio wave to be transmitted is to be shifted, wherein the instructor is configured to provide an instruction regarding the determined transmission cycle to the reception device in accordance with a value obtained by shifting the center frequency of the radio wave to be transmitted based on the management data.

5. The electronic device according to claim 1, comprising:

a saver configured to save a relational expression indicating a value relationship between the estimated speed and a value by which the center frequency of the radio wave to be transmitted is shifted, wherein the instructor provides the instruction based on the relational expression.

6. A wireless power transmission system comprising:

an electronic device; and a power-supplied device configured to be supplied with power through a radio wave received from the electronic device, wherein the electronic device includes:

a transmitter configured to transmit a radio wave;

a receiver configured to receive a radio wave;

an estimator configured to estimate, using a prescribed signal included in the received radio wave, a movement speed of a reception device and/or a speed varying in a propagation path between a main device and the reception device;

a determiner configured to determine, using the estimated speed, a transmission cycle of the prescribed signal; and an instructor configured to provide an instruction regarding the determined transmission cycle to the reception device, the instruction being in accordance with a value obtained by shifting a center frequency of the radio wave to be transmitted in a channel allocated for power supply, and the power-supplied device includes:

a second transmitter configured to transmit the prescribed signal to the electronic device; and a second controller configured to set the transmission cycle of the prescribed signal based on the center frequency of the received radio wave.

7. A control method comprising:

performed by an electronic device including a transmitter configured to transmit a radio wave and a receiver configured to receive a radio wave, estimating, using a prescribed signal included in the received radio wave, a movement speed of a reception device and/or a speed varying in a propagation path between a main device and the reception device;

determining, using the estimated speed, a transmission cycle of the prescribed signal; and providing an instruction regarding the determined transmission cycle to the reception device, the instruction being in accordance with a value obtained by shifting a center frequency of the radio wave to be transmitted in a channel allocated for power supply.

8. A non-transitory computer-readable storage medium storing a control program that causes an electronic device including a transmitter configured to transmit a radio wave and a receiver configured to receive a radio wave to execute:

estimating, using a prescribed signal included in the received radio wave, a movement speed of a reception device and/or a speed varying in a propagation path between a main device and the reception device;

determining, using the estimated speed, a transmission cycle of the prescribed signal; and providing an instruction regarding the determined transmission cycle to the reception device, the instruction being in accordance with a value obtained by shifting a center frequency of the radio wave to be transmitted in a channel allocated for power supply.

* * * * *